United States Patent [19]

Kita et al.

[11] Patent Number: 4,568,187
[45] Date of Patent: Feb. 4, 1986

[54] CONCAVE GRATING SPECTROMETER

[75] Inventors: Toshiaki Kita, Tokyo; Tatsuo Harada, Fuchu, both of Japan

[73] Assignee: Hitachi, Ltd., Tokyo, Japan

[21] Appl. No.: 504,437

[22] Filed: Jun. 15, 1983

[30] Foreign Application Priority Data

Jun. 25, 1982 [JP] Japan .................. 57-108337

[51] Int. Cl.$^4$ .............................. G01J 3/20
[52] U.S. Cl. .................... 356/328
[58] Field of Search ............. 356/305, 328, 326, 334

[56] References Cited

U.S. PATENT DOCUMENTS 4,012,843  3/1977  Harada et al. ............... 33/19 A
4,030,828  6/1977  Sonobe et al. ............... 356/334

Primary Examiner—F. L. Evans
Attorney, Agent, or Firm—Antonelli, Terry & Wands

[57] ABSTRACT

In a concave grating spectrometer for creating a spectral image by dispersing a light to be measured according to the wavelength, an arrangement comprising a concave grating with varied spacing and/or curved grooves formed on a concave spherical surface, and an entrance slit located at such a position on a vertical focal line passing through the center of curvature of the spherical surface, that the sum of the square of the difference between horizontal and vertical focal lengths at each wavelength in the wavelength range takes a minimum value. The light to be measured projected through the entrance slit is dispersed by the concave grating according to the wavelength and an image is focused on the vertical focal line passing through the center of curvature of the spherical grating.

8 Claims, 7 Drawing Figures

FIG. I
PRIOR ART
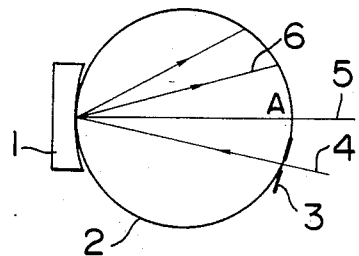
FIG. 2
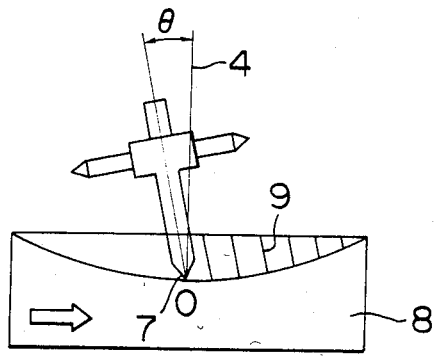
FIG. 3
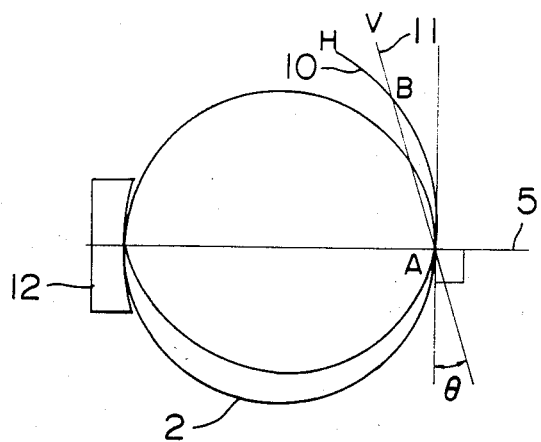

CONCAVE GRATING SPECTROMETER

BACKGROUND OF THE INVENTION

The present invention relates to a concave grating spectrometer which disperses and focuses the light to be measured depending on its wavelength and, particularly, to a concave grating spectrometer which provides the spectral image free of astigmatism adapted for use in a polychromator using a semiconductor photo detector.

Among various types of spectrometers which have been employed in polychromators, the most popular one is the concave grating spectrometer which has a very simple optical system and does not need an independent focusing device such as a spherical mirror. The spectral image dispersed and focused depending on its wavelength by the spectrometer is detected by a photo detector which may be a dry plate, or a plurality of photomultiplier tubes or solar cells disposed at the respective focusing positions of the spectrum. Recently, there have been practiced photo detector arrays in which a plurality of small semiconductor photo sensors such as charge coupled devices (CCDs) and photodiodes are aligned at a constant spacing. This photo detector array is formed by integrating several hundreds or more of the above-mentioned semiconductor photo sensors on a line, providing easiness of handling and also allowing the measurement of the light intensity for many wavelengths in a very short time. Accordingly, by combining a photo detector array with the aforementioned concave grating, a polychromator capable of high-speed measurement with a simple structure can be realized.

However, the currently available photo detector arrays are those in which photo sensors are arranged in a flat field and therefore, in order to use the photo detector array, it is a prerequisite for the spectrometer to have an optical system which focuses a spectral image on the same plane. As shown in FIG. 1, the conventional concave grating 1 wherein constantly spaced, straight grooves (on a blank plane) are formed on a concave spherical surface (refer to e.g. HANDBUCH DER PHYSIK, by G. W. Stroke, Vol. XXIX, 1967, pp. 472–486) creates a spectral image surface which is a cylindrical surface including a Rowland circle 2 with a diameter equal to the radius of the spherical surface and normal to the drawing, and the above-mentioned condition is not satisfied. In FIG. 1, reference number 3 denotes an entrance slit, 4 is a beam of sample light to be measured, 5 is the normal of the diffraction grating surface, 6 is a beam of the dispersed monochromatic light, and A is the center of curvature of the spherical surface.

To cope with this problem, there has been employed a method of using a concave grating with such a horizontal focal line which is called lemniscate, wherein grooves are formed in variably spaced, curved configuration by a holographic method using the interference of laser, and the relatively linear portions of the horizontal focal line are used to produce an approximate planar image surface (refer to HEWLETT-PACKARD JOURNAL, by G. W. Hopkins & A. Schwartz, February 1980, p. 17). This method meets the condition of the planar focusing, but has a problem of remaining astigmatism in the spectral image.

Astigmatism does not practically cause a problem when the photo sensitive area of the detector is dimensioned sufficiently large in the direction of height of the spectral image such as the cases of using dry plates or photomultiplier tubes, however, the photo detector array does not have a large enough height in each photo sensor, resulting in the overflow of the light due to astigmatism, and a significant amount of light will be lost. When measuring the spatial distribution of light intensity in the height direction of the entrance slit by using a 2-dimensional photo detector array which is formed by aligning photo sensors also in the height direction, the presence of astigmatism causes the interference, and the accurate measurement cannot be expected.

SUMMARY OF THE INVENTION

It is an object of the present invention to solve the foregoing prior art problems, and to provide a concave grating spectrometer capable of focusing a spectral image on one plane by substantial elimination of astigmatism in a wide range of wavelength. In order to achieve the above object, an aspect of the present invention resides characteristically in an arrangement of the concave grating spectrometer with variably spaced and/or curved grooves formed on a concave spherical surface, wherein upon confirmation that there should exist a condition for achieving approximate coincidence of the horizontal focal line with the vertical focal line passing through the center of the sphere (astigmatism is nullified on the vertical focal line) by setting the incident angle to a specific angle, the entrance slit is placed at a position on the vertical focal curve passing through the center of the sphere and, at an incident angle determined from the above condition, whereby the image is focused on the vertical focal curve passing through the center of the sphere.

BRIEF DESCRIPTION OF THE DRAWINGS

FIG. 1 is an explanatory diagram showing prior art.

FIG. 2 is an explanatory diagram showing the method of manufacturing the concave grating with varied spacing and curved grooves used in an embodiment of the present invention.

FIG. 3 is a diagram showing the horizontal and vertical focal lines of a concave grating with varied spacing and curved grooves.

DESCRIPTION OF THE PREFERRED EMBODIMENTS

Figure 4:
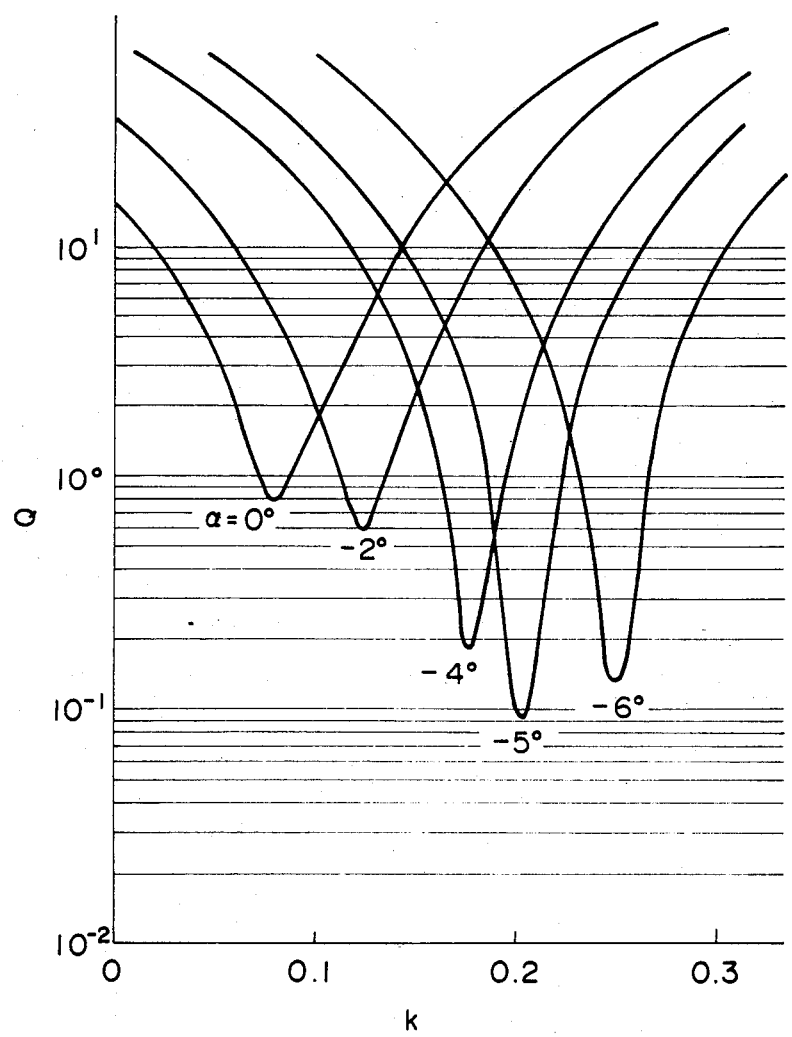
FIG. 4 is a graph showing variations of the sum of the square of the difference between the horizontal and vertical focal lengths.

The invention will now be described with reference to the drawings. FIG. 2 shows a method of manufacturing a concave grating with variably spaced and curved grooves which was proposed by the present inventors and others in U.S. Pat. No. 4,012,843. The diamond tool 7 moves back and forth within a plane including a line slanted by an angle $\theta$ with respect to the normal 4 of the blank 8 at the center 0 and being perpendicular to the sheet of drawing. The spherical blank 8 is fed with a varied spacing in the direction shown by the arrow, and variably spaced, straight grooves 9 with an inclination of θ when observed from the front side of the drawing sheet are formed. The grooves are ellipsoidal with a certain ellipticity determined by θ and the curvature of the spherical surface when they are projected along the normal 4.

Figure 6:
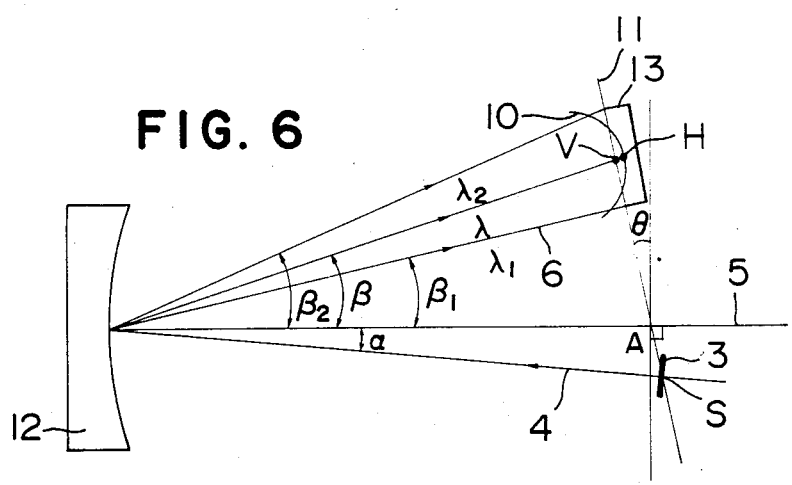
FIG. 6 is a plan view showing one embodiment of the present invention.

The concave grating with mechanically ruled grooves which are formed as described above has the horizontal and vertical focal lines as expressed by the following Equations (1) and (2), respectively.

$$\frac{1}{2}\left(\frac{\cos^2\alpha}{r} - \frac{\cos\alpha}{R}\right) + \frac{1}{2}\left(\frac{\cos^2\beta}{r'_H} - \frac{\cos\beta}{R}\right) + \quad (1)$$

$$\frac{(\sin\alpha + \sin\beta)}{R} \cdot \left(k - \frac{\tan\theta}{2}\right) = 0$$

$$\frac{1}{2}\left(\frac{1}{r} - \frac{\cos\alpha}{R}\right) + \frac{1}{2}\left(\frac{1}{r'_v} - \frac{\cos\beta}{R}\right) - \quad (2)$$

$$\frac{(\sin\alpha + \sin\beta)}{2R} \cdot \tan\theta = 0$$

where, as shown in FIG. 6, α is the incident angle of the light, β is the diffraction angle of the light of wavelength λ, r is the length $\overline{OS}$ between the entrance slit and the concave grating, $r'_H$ is the horizontal focal length $\overline{OH}$, $r'_V$ is the vertical focal length $\overline{OV}$, R is the radius of curvature $\overline{OA}$ of the spherical surface of the grating, θ is the inclination angle of the grooves formed on the spherical surface of the grating as mentioned in connection with FIG. 2, and k is a constant determining the spacing of grooves. Further reference may be made to the above-mentioned U.S. Patent.

One example of the horizontal focal line obtained from Equation (1) is shown at 10 in FIG. 3, and one example of the vertical focal line obtained from Equation (2) is shown at 11 in FIG. 3. In the figure, reference number 12 denotes the concave grating, and A denotes the center of curvature of that spherical surface. As shown in the figure, the horizontal focal line 10 is a curve, while the vertical focal line 11 is a straight line, and they do not coincide with each other except at specific points A and B, in the shown example.

In general spectrometers, the focal point in the horizontal direction is more important than that in the vertical direction in order to obtain the satisfactory resolution, and therefore, in assembling a spectrometer, photo sensors are disposed on the horizontal focal line, resulting in the occurrence of astigmatism in the spectral image. If the photo sensitive surface is planar as in the case of the photo detector array, there is a question on which position on the horizontal focal line the photo sensors should be placed, in addition to the above problem. The present inventors examined the possibility of using the vertical focal line as an approximation of the horizontal focal line, by which the problem of astigmatism can be solved concurrently.

Figure 5:
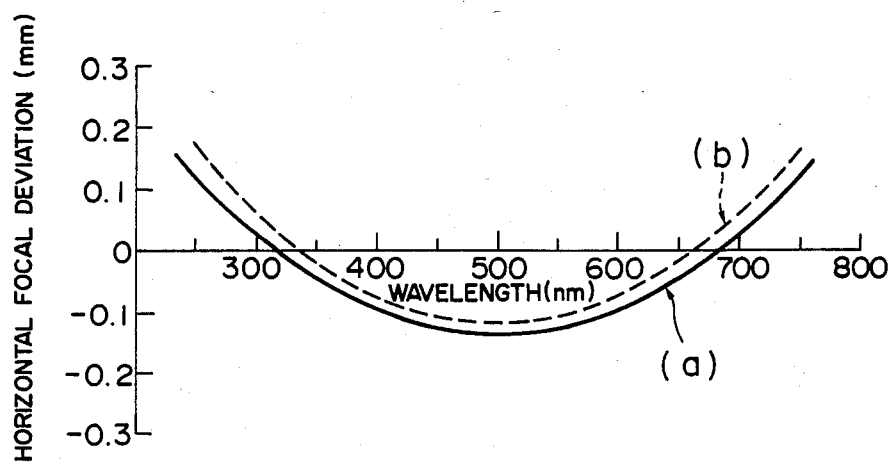
FIG. 5 is a diagram showing the error of the horizontal focal length caused by the linear approximation.

FIG. 4 shows the result of calculation for the sum of the square of the difference of the vertical and horizontal focal lengths $(r'_v - r'_H)$ for each wavelength Q = $\Sigma(r'_v - r'_H)$ with the incident angle α and the above-mentioned constant k being used as parameters. For example, the specifications are: number of grooves 300 grooves/mm, radius of curvature 50 mm, θ=8°, and the range of wavelength 250–750 nm. It is needless to say that the smaller the value of Q, the better characteristics are obtained. As can be seen from FIG. 4, the sum of the square Q has the minimum value for each incident angle, the value of Q varies depending on the incident angle α, and its envelope has the minimum value. More precise calculations for α and k around the minimum value of Q shown in the figure gives the minimum value of Q more precisely at α=−5.6° and k=0.2338. The value of $(r'_v - r'_H)$ for each wavelength, i.e., the horizontal focal deviation, is shown by the solid line (a) in FIG. 5. The result shown by (a) is not much different from the focal deviation obtained by approximating the horizontal focal line by a straight line by so choosing the varied spacing constant k that the horizontal focal line is as more linear as possible within the wavelength range to be used (shown by the dashed line (b) in FIG. 5). It was confirmed in another example that there exists surely one condition allowing the horizontal focal curve to be approximated by a linear vertical focal line by choosing an appropriate incident angle.

FIG. 6 is a diagram explaining one embodiment of the present invention. The figure is a plan view of the polychromator made up of the inventive concave grating spectrometer with a photo detector array (e.g., CCD array, photodiode array, etc.) for measuring the wavelength range of, for example, 250–750 nm.

The specifications of the concave grating and optical devices are as follows.
Number of grooves (in average): 300 grooves/mm,
Radius of curvature: 50 mm,
Incident angle α: −5.6°,
k: 0.2448,
θ: 8°,
r: 50.94.

An entrance slit 3 and a photo detector array 13 are placed on a line passing through the center of curvature A of the spherical concave grating 12, i.e., the line 11 which is the approximate horizontal focal line and at the same time the vertical focal line as described previously. The light to be measured 4 is incident through the entrance slit 3 onto the concave grating 12. The light 6 dispersed by the grating 12 depending on the wavelength is focused on a certain photo sensor in the photo detector array 13 provided on the focal surface to form a spectral image free of astigmatism.

Figure 7:
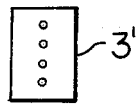
FIG. 7 illustrates an entrance slit formed of a plurality of aligned pin holes.

According to the embodiment of FIG. 6, astigmatism does not appear in the spectral image, allowing the efficient measurement of the light. It is also possible to measure accurately the distributions of the spectral intensity spatially by disposing a plurality of pin holes in the vertical direction of the slit as an entrance slit 3' as illustrated in FIG. 7 instead of using the entrance slit 3, and by using a 2-dimensional photo sensor such as a 2-dimensional photo detector array. For example, simultaneous detection of gas spectra can be made in such a spectrometer.

Although the embodiment has been described mainly for the spectrometer using a concave grating with varied spacing and curved grooves formed by mechanical ruling which was proposed by the present inventors and others, the inventive arrangement is also applicable to concave gratings with varied spacing and straight grooves and concave grating with constantly spaced curved grooves.

According to the present invention, as described above, there is provided a concave grating spectrometer which focuses a spectral image free of astigmatism on the planar image surface, and by combination with a photo detector array, a simply structured, high performance polychromator can be realized.

1. A concave grating spectrometer having a concave grating for dispersing a light to be measured in a wavelength range, according to the wavelength and for providing a spectral image, comprising:

a concave grating having varied spacing and/or curved grooves formed on a concave spherical surface, which can produce a horizontal focal line crossing a vertical focal line;

entrance slit means disposed at such a position on the vertical focal line passing through the center of curvature of the spherical surface so that the sum of the square of the difference between horizontal and vertical focal lengths at each wavelength in the wavelength range takes a minimum value, whereby the light to be measured incident through said entrance slit means on the grating is dispersed thereby according to the wavelength and an image is focused by said concave grating on the vertical focal line passing through the center of curvature; and a light detecting means located at the image focusing position.

2. A concave grating spectrometer according to claim 1, wherein said entrance slit means comprises a plurality of aligned pin holes.

3. A concave grating spectrometer according to claim 1, wherein said light detecting means comprises a photodiode array.

4. A concave grating spectrometer according to claim 1, wherein concave grating has varied spacing and curved grooves formed on a concave spherical surface.

5. A concave grating spectrometer having a concave grating for dispersing a light to be measured in a wavelength range according to the wavelength and for providing a spectral image, comprising:

a concave grating having varied spacing and/or curved grooves formed on a concave spherical surface, which can produce a horizontal focal line crossing a vertical focal line;

entrance slit means disposed at such a position on the vertical focal line passing through the center of curvature of the spherical surface so that the sum of the square of the difference between horizontal and vertical focal lengths at each wavelength in the wavelength range takes a minimum value;

means for forming an image on the vertical focal line passing through the center of curvature;

whereby a light to be measured, incident through said entrance slit means, is dispersed by said concave grating according to the wavelength and an image is focused by said concave grating on the vertical focal line; and a light detector located at the image focusing position.

6. A concave grating spectrometer according to claim 5, wherein said entrance slit means comprises an alignment of a plurality of pin holes.

7. A concave grating spectrometer according to claim 5, wherein said light detector comprises a photodiode array.

8. A concave grating spectrometer according to claim 5, wherein said concave grating has varied spacing and curved grooves formed on a concave spherical surface.

* * * * *